Jan. 18, 1966 E. WILDHABER 3,229,541
GEARING
Filed March 25, 1963 2 Sheets-Sheet 1

INVENTOR:
Ernest Wildhaber

Jan. 18, 1966  E. WILDHABER  3,229,541

GEARING

Filed March 25, 1963  2 Sheets-Sheet 2

INVENTOR:

Ernest Wildhaber

United States Patent Office 3,229,541
Patented Jan. 18, 1966

3,229,541
GEARING
Ernest Wildhaber, Brighton, N.Y.
(124 Summit Drive, Rochester 20, N.Y.)
Filed Mar. 25, 1963, Ser. No. 267,449
12 Claims. (Cl. 74—384)

The present invention relates to gearing wherein one member of a pair of gears is angularly adjustable or movable about a pivot axis, so that the gear pair may run on angularly disposed axes as well as on parallel axes. Particularly it refers to gearing whose axes remain in a common plane, one of the two axes being angularly adjustable in said plane. In effect such gearing can be considered a combination between a gear pair and a constant-velocity universal joint.

Adjustable gearing with this intended function has been shown in many old patent drawings. It comprises a toothed member (20 in FIG. 2) of convex outline, adapted to pivot about the center (21) of said outline and engaging a mating toothed member (22) that may be of socket form. However such structure alone is not sufficient to provide an operative pair that transmits uniform motion at angularities of the axes within the design limits.

One object of the present invention is to provide an exact shape for such adjustable gearing, so that it transmits uniform motion when running on parallel axes and when running at an angle, and so that it has ample tooth bearing and load capacity. A further object is to devise an adjustable gearing of this kind where the teeth are inclined to axial planes. A further aim is to devise a method for accurately producing this gearing. Other objects will appear in the course of the specification and in the recital of the appended claims.

Figure 8:
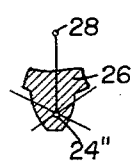
Figure 7:
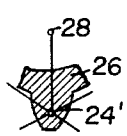
Figure 6:
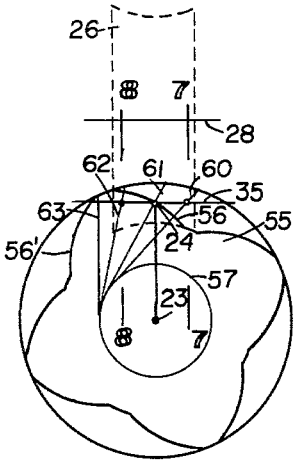
FIG. 6 is a cross-section of this basic involute helicoid, taken at right angles to its axis.

FIGS. 7 and 8 are fragmentary sections taken along lines 7—7 and 8—8 respectively of FIG. 6 through the socket-shaped gear of concave outline.

Figure 9:
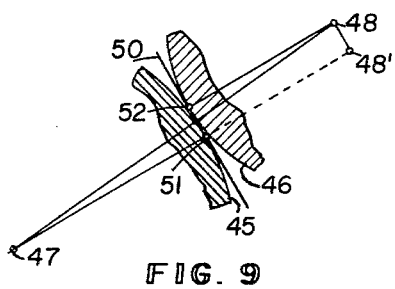

FIG. 9 is a diagram explanatory of the localization of tooth bearing obtained when the gears run at an angle.

Figure 10:
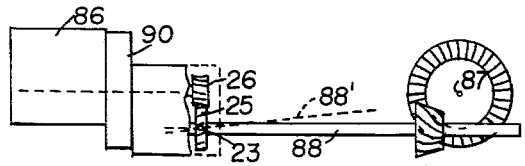
Figure 11:
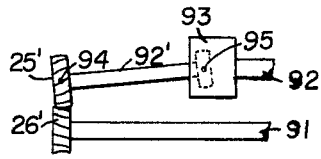

FIG. 10 and FIG. 11 are diagrams showing two applications of this gearing.

Figure 12:
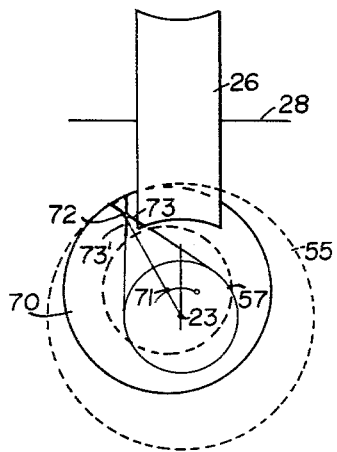

FIG. 12 is a diagram illustrating a preferred method of generating the socket-shaped gear member 26 with a hob.

Figure 13:
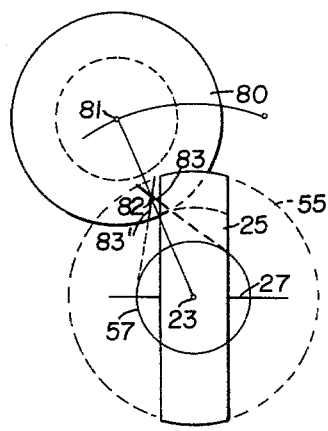

FIG. 13 is a diagram illustrating a preferred method of generating the convex gear member.

Figure 14:
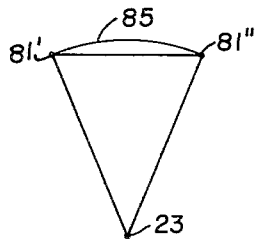

FIG. 14 is a diagram further explanatory of the procedure when the arcuate feed path of the hob is made up of a straight-line motion axially of the workpiece and of a motion perpendicular thereto.

Figure 1:
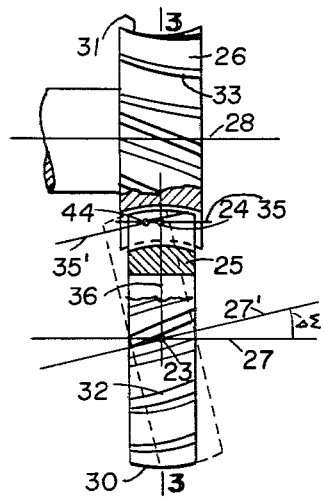
FIG. 1 is a side view of a gear pair constructed according to the present invention, taken at right angles to the plane of their axes, and partly a section along said plane. The gear teeth are here inclined to axial planes, somewhat like helical teeth.

The gears 25, 26 have turning axes 27, 28 that lie in a common plane, the drawing plane of FIG. 1. Gear is angularly adjustable about a pivot 23 that intersects its axis 27 and is perpendicular to said plane. Thus in one position axis 27 is parallel to axis 28, and in other positions 27' it is angularly disposed thereto. The gear blanks and the teeth are formed to permit such angular displacement. Gear 25 has a convex outline 30. In the illustrated instance its outside surface is a spherical surface centered on the pivot axis at its intersection with the gear axis 27. Gear 26 has a concave outline 31 that corresponds to the convex outline of gear 25 and so to say forms a socket therefor. It may be referred to as the socket gear.

The teeth 32, 33 are inclined to axial planes of the respective gears somewhat like helical teeth. This novel feature, new in adjustable gearing, makes for quietness of operation. Like mating helical gears the gears 25, 26 are of opposite hand, one being left hand and the other right hand.

When the axes 27, 28 are parallel, a pair of imaginary cylindrical pitch surfaces 25', 26' (FIG. 3) roll on each other without sliding, as the gears turn with them. They contact each other along a straight line 35 parallel to the axes 27, 28 and containing a mean point 24. Line 35 is the axis of instantaneous relative motion of the two gears. Gear contact at any instant is along the projection of axis 35 to the tooth surfaces.

The position of point 24 may be assumed at will on the line of centers 36 (FIG. 3), midway between the tooth boundaries, or closer to the root surface or tooth-bottom surface of one or the other gear.

Figure 2:
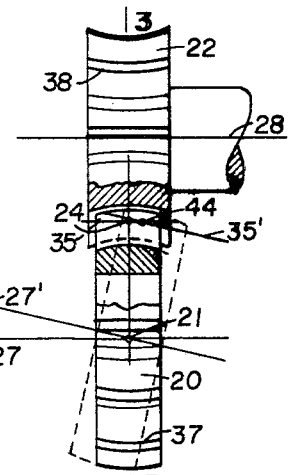
FIG. 2 is a similar side view and section of a gear pair whose teeth follow axial planes.

The gear pair 20, 22 of FIG. 2 is similar to the gear pair 25, 26 except that its teeth 37, 38 extend along axial planes, somewhat as the straight teeth of spur gears do. Gear 20 has a spherical outside surface, while gear 22 has a socket-like shape of concave outline.

The best definition of the tooth shape of gears capable of running on parallel axes is by the tooth shape of the basic rack whose pitch plane rolls on the cylindrical pitch surfaces of the gears. This basic rack has the same instantaneous axis 35 as the intermeshing gears and contacts the gears along the same lines along which the gears contact each other. The rack shape can be interposed between the mesh of the gears when the tooth surfaces of the rack are considered infinitely thin. The two gears of the pair then contact opposite sides of the infinitely thin rack tooth surfaces which can be considered to separate them.

Figure 4:
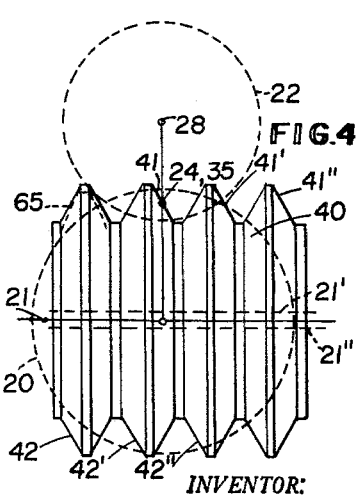
FIG. 4 is a side view of the basic rack shape to which the gears of FIG. 2 are conjugate. The basic rack has conical tooth sides whose common axis coincides with the pivotal axis 21, FIG. 2.

FIG. 4 illustrates the basic rack 40 of the gears 20, 22. The rack 40 contains equispaced and identical conical tooth sides 41, 41', 41'' and 42, 42', 42'' whose common axis coincides with the pivot axis 21. Socket gear 22 contacts the convex side of the conical tooth sides, that is the outside thereof. Convex gear 20 contacts the concave side or inside of the conical tooth sides.

When the gear 20 is tilted about the pivot axis 21 line or axis 35 is tilted with it to a position 35' parallel to turning axis 27' (FIG. 2). Contact of gear 20 with the rack shape remains along the projection of axis 35'. As the axes 35, 35' are now inclined to each other, their projections to the rack tooth surfaces no longer coincide. The two gears 20, 22 contact the rack tooth surfaces along lines inclined to each other.

The axes 35, 35' intersect at point 44. The normal projection to the rack tooth surfaces locates the common contact points of the two gears. This applies to all turning positions of the gears. These contact points, the projections of common point 44, form the center of the contact region when the gears run on angularly disposed axes. When the gears are considered absolutely rigid the gear portions away from this contact region do not get into physical contact with each other, but come to within a small distance z from each other.

Diagram FIG. 9 shows how distance z may be estimated and computed. FIG. 9 is a large-scale section perpendicular to axis 28 and taken at a distance from common point 44. The two gear profiles 45, 46 have curvature centers 47, 48 and contact the rack profile 50 at points 51 and 52 respectively. Points 51, 52 are the normal projections of the intersection points between the axes 35, 35' and the considered sectional plane.

For convenience the curvature circles of the tooth profiles at mean point 24 may be substituted for the profiles 45, 46. It will be understood that the separation z of the profiles 45, 46 amounts to the difference between distance 47–48 minus the sum of the profile radii 47–51 and 48–52. The said sum equals distance 47–48', and where 48' is the projection of point 48 to the extended radius 47–51.

With x denoting the distance of the considered section from point 44, r and R denoting the pitch radii of the gears, $\varphi$ denoting the pressure angle or profile inclination at mean point 24, and $\Delta\Sigma$ denoting the angle between the axis positions 27 and 27', the following approximate formula may be derived for distance z from the above considerations:

$$z = \frac{(x \text{ arc } \Delta\Sigma \cos \varphi)^2}{2(r+R) \sin \varphi}$$

arc $\Delta\Sigma$ is understood to be the angle $\Delta\Sigma$ in radian measure.

It is also of interest to determine the distance $f$ lengthwise of the teeth where the separation z is within a given small distance $z_0$, such as within 0.001". $z_0$ is so selected that the area extending $\frac{1}{2}f$ to both sides from common point 44 may be consiered in working engagement in average service, because of elastic deformation and of the oil film. $f=2x$ is obtained by transforming the above formula to $$f = \frac{\sqrt{8z_0 \sin \varphi}}{\cos \varphi} \cdot \frac{\sqrt{r+R}}{\text{arc}\Delta\Sigma}$$

wherein the first factor is a constant depending only on angle $\varphi$ and on assumed distance $z_0$.

In an example: $z_0 = 0.001"$; $\varphi = 22\frac{1}{2}°$, $(r+R) = 3"$.

Distance $f$ is then:

$f = 1$ inch at $\Delta\Sigma = 5.94$ degrees, in either direction.
$f = \frac{1}{2}$ inch at $\Delta\Sigma = 11.88$ degrees.

These figures are based on a full bearing when the gear axes are parallel.

It is seen that the teeth do not jam when gear 20 is tilted. The only effect of tilting is a localization of the tooth bearing. There is practically no change at small angles $\Delta\Sigma$. Uniform motion continues to be transmitted, as each gear continues to transmit uniform motion to the interposed basic rack. Also there is no change in backlash with changing shaft angles $\Delta\Sigma$.

Instead of providing a full bearing at parallel axes, crowning may also be provided there, so that the tooth bearing is localized. In this case the two mating gears may be made conjugate to very slightly different basic racks. The axis of the rack for gear 20 may be at 21'; and the axis of the rack for gear 22 may be at 21". This disposition removes some stock, the extra ease-off, increasingly towards the ends of the teeth.

The described conical tooth sides 41, 42 represent the preferred embodiment for teeth extending along axial planes. However other surfaces of revolution may also be used if desired.

The above formulas apply roughly also to the gearing described with FIG. 1, where the teeth are inclined to planes containing the gear axis.

Figure 5:
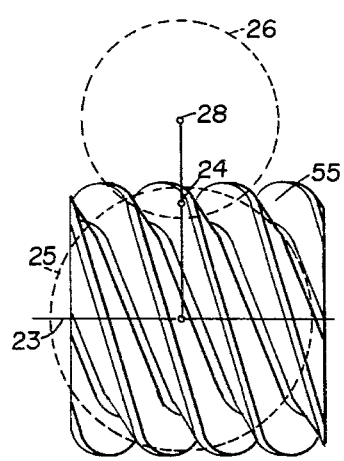
FIG. 5 is a side view of the basic rack shape to which the gears of FIG. 1 are conjugate. It is an involute helicoid whose axis coincides with the pivotal axis 23, FIG. 1.

FIG. 5 illustrates the basic rack shape for this latter case. It is a helicoid 55 of constant axial lead, whose axis coincides at least approximately with the pivot axis 23.

Helicoid 55 has a constant profile in all axial planes, that contain the axis of the helicoid, and also a constant profile in all planes perpendicular to its axis.

In principle a helicoid of any profile shape could be used, but I prefer involute helicoids. Helicoid 55 contains involute profiles 56, 56' (FIG. 6) in cross-sections at right angles to its axis 23. Profiles 56, 56' have a base circle 57, to which all profile normals 60, 61, 62, 63 are tangent. As known, the involute helicoid has straight profiles in planes parallel to its axis 23 and tangent to base circle 57, such as in planes containing lines 60, 61, 62, 63. Moreover each of these straight profiles has a common tangent plane all along its length, and all surface normals of the involute helicoid have the same constant inclination to the direction of its axis.

I shall describe particularly the case of full tooth contact without easeoff when the gear axes are parallel. Here the axis of the basic helicoid coincides exactly with the pivot axis 23. For producing easeoff two helicoids may be used for the two mating gears. Their axes coincide only approximately with the pivot axis 23, as described for axes 21', 21" with FIG. 4. The helicoid 55 may move exactly like a rack to generate or envelop the gear tooth surfaces, moving along its axis 23 without turning. The same effect is also attained by turning it on its axis without endwise movement. In either case gear 26 is formed conjugate to the convex or outside helical surface of helicoid 55, while gear 25 is conjugate to the inside surface of the helicoid. The helicoid can be imagined to be hollow and to have infinitely thin sheets of tooth surfaces, interposed between the mesh of the two gears. When the gear axes are parallel, the gears contact the helicoid and each other along the common projection of the instantaneous axis 35 to the tooth surfaces.

When however the axis of gear 25 is at an angle, in position 27', gear 25 contacts the helicoid along the projection of tilted axis 35', while gear 26 continues to contact it along the projection of axis 35. The two different lines of contact cross each other at the projection of common point 44 of the axes 35, 35'. The projection of common point 44 marks the center of the tooth bearing. Easeoff is attained increasingly with increasing distance from point 44, as has been described for the embodiment of FIGS. 2, 4.

When the gears 25, 26 are said to be conjugated to helicoid 55, from opposite sides, it is understood that the gear tooth surfaces are completely envelopable by the tooth surfaces of the helicoid when the gears turn on their axes while the helicoid performs the straight-line rack motion in direct proportion to the turning motion of the gears, as if the pitch plane of the rack would roll without sliding on the cylindrical pitch surfaces of the gears. The tooth surfaces of the gears are the enveloped surfaces resulting from such motion, or from an equivalent motion.

In sections 7—7, 8—8 perpendicular to gear axis 28 the profile inclination changes, as it does on a wormgear. The side matching the helical side with profile 56 has a profile inclination increasing from right to left lengthwise of the teeth, (FIG. 6). The inclination is a maximum in the section along line 63 which is here outside of the gear body. The opposite side has a profile inclination increasing from left to right. FIGS. 7 and 8 show the profile normals that pass through points 24', 24" of the instantaneous axis 35 and the profiles of a tooth of gear 26. These are perpendicular respectively to said normals.

It is seen that opposite tooth profiles are unequally inclined, so that the tooth appears leaning to one side. The teeth lean to opposite sides in the sections 7—7, 8—8.

Dotted lines 65 (FIG. 4) indicate a fragmentary plane section taken through the conical rack 40 parallel to the rack axis 21 and offset therefrom. The opposite sectional profiles are less inclined than the straight profiles of the center section, and they are equally inclined. Here then there are no leaning teeth in the side sections parallel to axis 21. However, the profile inclination also changes lengthwise of the teeth, at an increasing rate with increasing distance from the center section.

Figure 3:
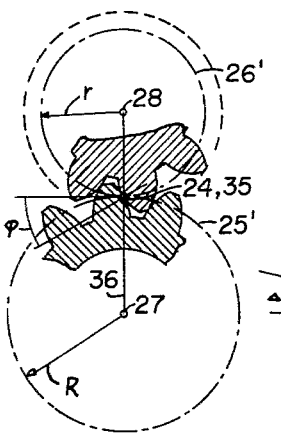
FIG. 3 is a fragmentary midsection taken along lines 3—3 of FIG. 1 and of FIG. 2.

Let us consider cylindrical sections coaxial with the gears, such as sections along the patch surfaces 25', 26' (FIG. 3). In these sections the teeth of the convex or crowned gear members 25, 20 decrease in thickness towards both tooth ends, while the teeth of the socket-type members 26, 22 correspondingly increase in thickness towards both tooth ends. In the cylindrical sections developed to a plane the teeth of the crowned members are of barrel shape, like the pitch-plane section of the basic rack member. Those of the socket-type members are of hourglass form. As well known the shapes match in the developed pitch surfaces.

The above said changing profile inclination is best compared at points of equal distance from the turning axis, that is at points of said cylindrical sections. At these points the profile inclination, in sections perpendicular to the turning axis, increases from right to left on one side and from left to right on the opposite side on both gears 26 and 25. On the gears 22, 20 the profile inclination is a maximum at the middle. It decreases towards both tooth ends.

Production

One way of generating the socket-shaped gear 26 is with a hob that represents the basic helicoid 55. The hob cutting edges lie in the helical thread thereof. Gear 26 is generated as if it were a wormgear meshing with a worm identical with helicoid 55. Either depthwise feed or axial feed may be used.

Similarly the socket-shaped gear 22 could be generated with a conical milling cutter that represents one or more pairs of the described conical surfaces of basic rack 40. As the cutter rotates on its axis it is also fed lengthwise of its axis, while the workpiece turns in proportion thereto, as if the gear would roll on the rack. Intermitted indexing is then used.

These methods require tools of the diameter of the basic member.

Smaller tools of diameters chosen at will can be used with the method to be described with FIG. 12. Tool 70 has an axle 71 parallel to the axis 23 of basic helicoid 55. Its thread surface meshes with said helicoid in a surface of action that passes through and contains an instantaneous axis 72 parallel to axis 23. When helicoid 55 is an involute helicoid, the mesh is in a plane 73 tangent to base circle 57 on one side and in a plane 73' on the opposite side. As it rolls around axis 23 the hob or tool 70 describes the entire basic helicoid and envelops the required tooth shape. Instantaneous axis 72 is preferably within the boundaries of the teeth. It may however also lie outside thereof. At the instantaneous axis the hob thread and the basic helicoid have the same lead angle.

With this method the basic helicoid does not need to have an integral number of threads, but of course the hob does. The basic helicoid may well have a fractional number of threads. This facilitates the design, as one restriction is removed. The basic helicoid has preferably more than one thread, multiple threads, integral or fractional.

A hob moved about axis 23 with the hob axis inclined thereto rather than parallel does not cover the active length of the basic helicoid, but only a central portion thereof. Beyond that it projects outwardly of the basic helicoid so that it does not give exact results. Further departure is incurred when such a hob is moved in a circular path, so that its center describes a circle about axis 23 while the hob axis remains in a parallel inclined position. Such motion is sometimes called a circular translation.

A hob can also be used to describe the basic member or rack 40 (FIG. 4). Its axis should be parallel to the axis 21 of said member.

FIG. 13 shows how a hob 80 may be used for generating convex member 25. The hob axis 81 is parallel to axis 23. Hob 80 is fed about axis 23 of the basic helicoid 55 so as to successively describe the entire helicoid, while the workpiece and helicoid turn on their axes as if running together. Thereby the tooth surfaces of the convex member are generated. The hob threads may mesh with member 55 so that the instantaneous axis 82 of the relative rolling motion is within the thread boundaries, mesh being in planes 83, 83'.

Similarly a hob set with its axis parallel to the axis of the basic member 40 (FIG. 4) may be fed about axis 21 to produce the gears 20.

The circular feed path of the hob can also be made up of a component parallel to the gear axis and of a component radial thereof. Thus the feed path 85 (FIG. 14) of the hob axis may be resolved into a straight component 81'–81" and into a radial component perpendicular to 81'–81", so that in combination the hob center describes the arc 85 relatively to the workpiece. By splitting up the feed in this way conventional hobbing machines can be used with little alteration. During such feed the hob timing with respect to the workpiece should be changed in proportion to the length of the arc 85. Conventional machines provide a timing change in proportion to the straight component 81'–81". Thus provision should be made for a slight additional timing change.

In place of this additional timing change the depth of cut can be slightly modified, but this requires cutting opposite sides of the teeth separately.

Applications

Of the many applications only two will be specifically referred to. FIG. 10 diagrammatically illustrates an automobile drive from an engine 86 to the rear axle 87. At present the propeller shaft is attached to a shaft in line with the engine crank shaft. This results in an inconvenient floor bulge especially at the front seats. Here now the propeller shaft 88 is set lower by using a self-adjusting gear pair 26, 25 which also acts as the universal joint of a torque tube drive. The torque tube axis pivots about an axis 23 and may get into positions such as 88'. The floor bulge is cured. Also a flywheel 90 of larger diameter can be used without coming too close to the ground. The larger diameter flywheel can be made lighter if of equal diameter.

FIG. 11 illustrates a drive between two parallel shafts 91, 92 of variable center distance. The shafts are connected by a gear pair 25', 26' and a gear coupling 93. The shaft portion 92' can tilt about center 94 of gear 25' and about center 95 of the gear coupling 93.

Other applications exist wherever the design requires a gear pair with pivotal movement of one member thereof.

While the invention has been described with several different embodiments thereof, it will be understood that it is capable of further modification, and this application is intended to cover any variations, uses, or adaptations of the invention following, in general, the principles of the invention and including such departure from the present disclosure as come within known or customary practice in the art to which the invention pertains, and as fall within the scope of the invention or the limits of the appended claims.

I claim:

1. Gearing comprising a gear with fixed axis of rotation and a mating gear whose axis lies in a plane containing the axis of the first-named gear and that is mounted for pivotal movement about an axis perpendicular to said plane, so that said gears may run on parallel axes and on angularly disposed axes, said mating gear having a convex outline, said gears being at least approximately conjugate from opposite sides to a basic rack that has the same instantaneous axis as the gears when the gear axes are parallel, the tooth surfaces of said rack extending about an axis and having a constant profile in planes containing said axis, said axis coinciding with said pivot axis.

2. Gearing according to claim 1, wherein said pivot axs intersects the axis of said mating gear.

3. Gearing according to claim 1, wherein the teeth of both gears extend along planes containing the axis of the respective gear.

4. Gearing comprising a gear with fixed axis of rotation and a mating gear whose axis lies in a plane containing the axis of the first-named gear and that is mounted for pivotal movement about an axis perpendicular to said plane, so that said gears may run on parallel axes and on angularly disposed axes, said mating gear having a convex outline, said gears having teeth inclined to planes containing the axis of the respective gear and being at least approximately conjugate from opposite sides to a basic rack that has the same instantaneous axis as the gears when the gear axes are parallel, said basic rack being a helicoid of constant lead whose axis coincides with said pivot axis.

5. Gearing according to claim 4, wherein the basic helicoid is an involute helicoid.

6. Gearing comprising a gear conjugate to a helical worm of constant lead and a mating gear adapted to run and mesh with the first-named gear on parallel axes, said gears having teeth inclined to axial planes and disposed at opposite hands.

7. Gearing comprising a gear conjugate to a helicoid of constant lead with a fractional number of threads, and a mating gear adapted to run and mesh with the first-named gear on parallel axes, said gears having teeth inclined to axial planes and disposed at opposite hands.

8. Gearing according to claim 6, wherein said helical worm has multiple threads.

9. Gearing comprising a gear with concave outline and a mating gear with convex outline adapted to run together with the first-named gear on parallel axes, the first-named gear being conjugate to a rack having identical conical tooth sides spaced along a common axis.

10. A crowned gear having a spherical outside surface centered on its axis and having teeth following said outside surface and decreasing in thickness towards both tooth ends in a cylindrical section coaxial with said gear, said teeth being inclined to planes containing said axis and to the direction of said axis in the manner of helical teeth.

11. A crowned gear having a convex outside surface and having teeth inclined to planes containing its axis of rotation and inclined to the direction of said axis, the profiles of said teeth in planes perpendicular to said axis changing lengthwise of the teeth in inclination, said inclination increasing on one side while decreasing on the opposite side.

12. A socket-type gear having teeth whose thickness increases towards both tooth ends in a cylindrical section coaxial with the gear axis, said gear being formed conjugate to a rack having equispaced identical coaxial tooth sides of conical shape, the axis of said tooth sides being offset from the gear axis and perpendicular thereto.

References Cited by the Examiner
UNITED STATES PATENTS

| | | | |
|---|---|---|---|
| 2,095,491 | 10/1937 | Beare | 74—462 X |
| 2,315,068 | 3/1943 | Matthews | 74—462 |
| 2,334,515 | 11/1943 | Sullivan | 74—384 |
| 2,682,760 | 7/1954 | Shenk | 74—462 X |
| 3,046,844 | 7/1962 | Wildhaber | 90—4 |
| 3,077,146 | 2/1963 | Ufert | 90—4 |

DON A. WAITE, *Primary Examiner.*